Sept. 2, 1958 N. CORDIS 2,850,013
ANIMAL PELLET INJECTOR GUN
Filed March 20, 1956 3 Sheets-Sheet 1
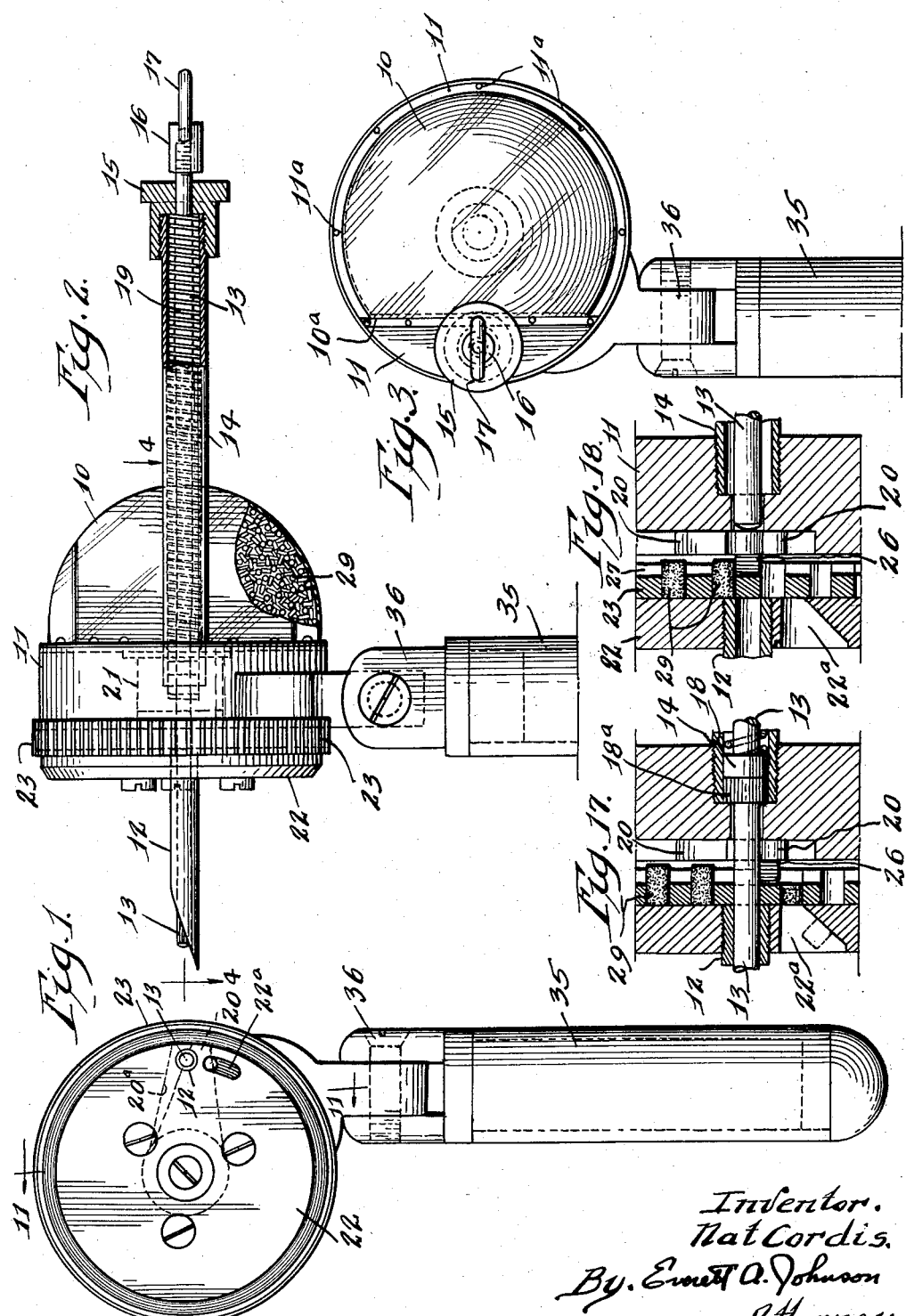
Inventor.
Nat Cordis.
By. Ernest A. Johnson
Attorney.

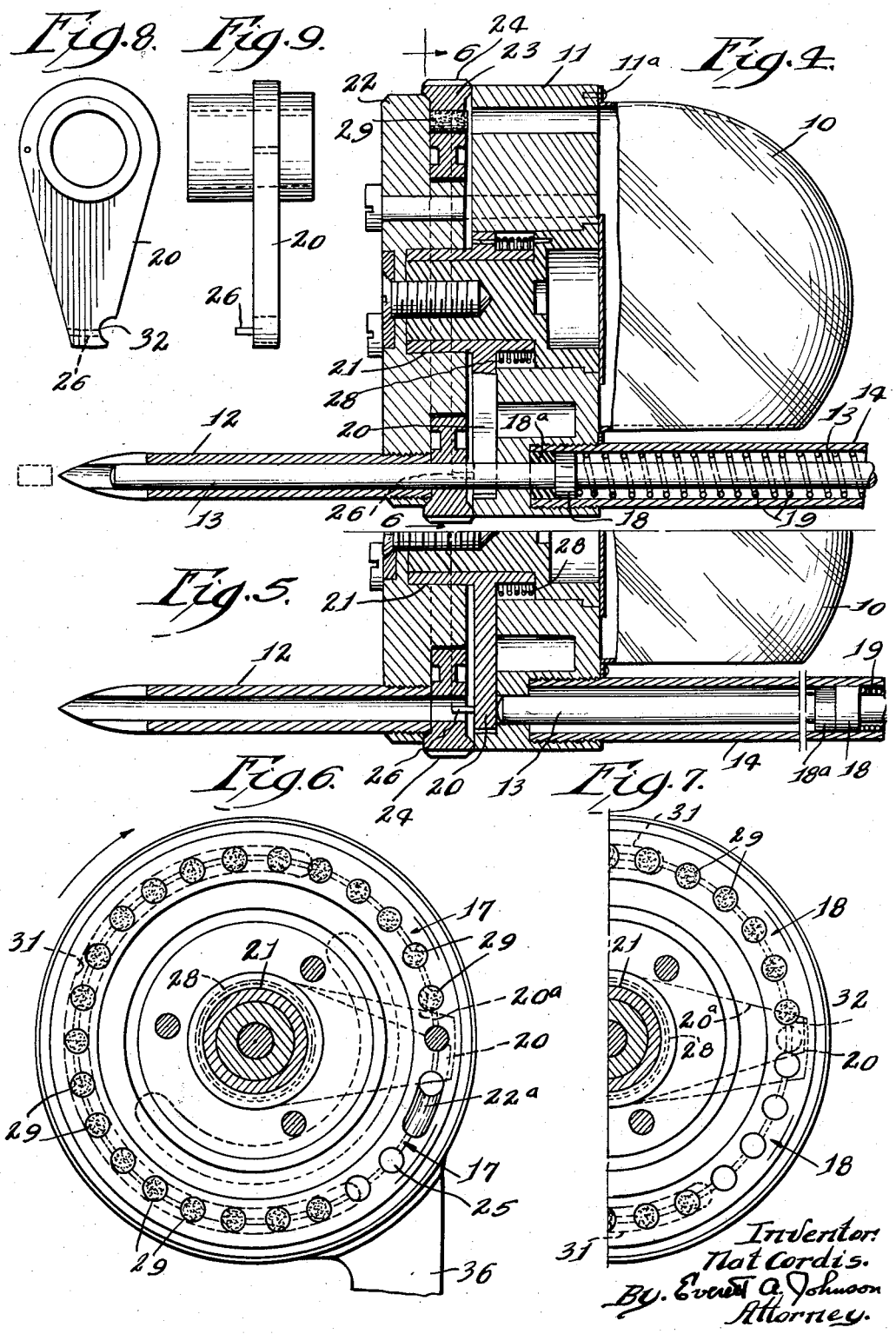

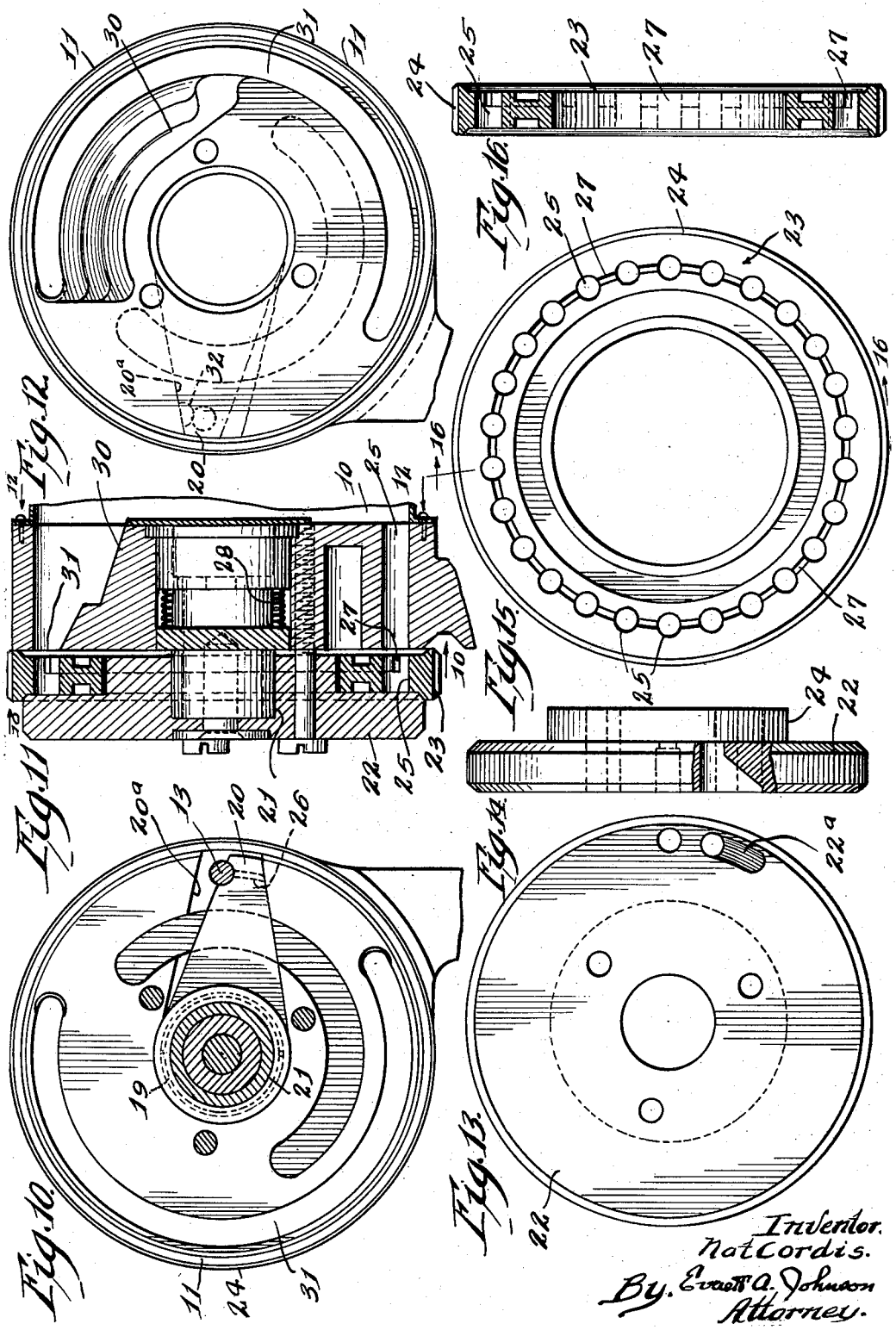

United States Patent Office 2,850,013
Patented Sept. 2, 1958

2,850,013

ANIMAL PELLET INJECTOR GUN

Nat Cordis, Silver Lake, Wis.

Application March 20, 1956, Serial No. 572,748

5 Claims. (Cl. 128—217)

This invention relates to a pellet injector for use in implanting a pellet beneath the skin of meat animals such as poultry and fowl to increase the tenderness, flavor, and/or weight thereof. This process is sometimes referred to as "hormonizing."

Many types of devices have been proposed for implanting pellets subcutaneously in fowl but none has been entirely satisfactory for one or more reasons. Many have been of the "single shot" type; whereas those of the repeater type have been expensive, difficult to operate and maintain, and did not assure delivery of whole pellets on each complete manipulation or implanting.

It is therefore a primary object of my invention to provide a pellet gun which is rugged and fool-proof in operation, is of simple mechanical construction, and which is adapted to carry and deliver a large number of pellets without frequent reloading. A further object is to provide an apparatus which may be held in any position to implant the pellet. Another object is to provide an injector which requires no particular skill in its operation. An additional object is to provide a pellet gun for use with bulk pellets which may be successively ejected in a positive and forcible manner. It is also an object to provide a pellet gun which will become inoperative when the pellets are not being ejected properly. A further object of the invention is to provide a pellet gun which is adapted to use cylindrical pellets thereby giving adequate dosage with a minimum rupture of the skin. An object of the invention is also to provide means for rejecting pellet fragments. A further object is to provide a device which will not deliver or implant fragments of the pellets. Another object of the invention is to provide a pellet gun which can be positioned for implanting without inadvertently ejecting a pellet before the needle has been inserted below the skin.

These and other objects of the invention will become apparent from the following description of a preferred embodiment of the pellet gun illustrated in the accompanying drawings wherein:

Figure 1 is a bottom plan view of a pellet gun constructed in accordance with one form of my invention;

Figure 2 is a side elevation, partly in section, of the device shown in Figure 1;

Figure 3 is a plan view of the gun shown in Figures 1 and 2;

Figure 4 is a fragmentary section taken along the line 4—4 in Figure 2;

Figure 5 is a view similar to Figure 4 but in the cocked position;

Figure 6 is a view taken along the line 6—6 in Figure 4;

Figure 7 corresponds to Figure 6 but shows the plunger and trigger in the cocked position;

Figures 8 and 9 illustrate details of the trigger;

Figure 10 is a view taken along the line 10—10 in Figure 11;

Figure 11 is a section taken along the line 11—11 in Figure 1;

Figure 12 is a view taken along the line 12—12 in Figure 11;

Figures 13 and 14 are plan and side views, respectively, of the bottom plate shown in Figures 1, 4, and 11;

Figures 15 and 16 are plan and edge views, respectively, of the turret shown in the assembly of Figures 2, 4, and 11;

Figure 17 is an enlarged section taken along the line 17—17 in Figure 6; and

Figure 18 is a view corresponding to Figure 17 taken along the line 18—18 in Figure 7.

Briefly, I attain the objects of my invention by providing a pellet gun which includes a holow needle with an ejector rod or plunger slidable therein to eject pellets from a rotated turret one by one. The plunger is operated by a spring which is compressed when the plunger is retracted and held in a cocked position. A trigger means is provided to release the plunger from its cocked position when a feeding disc or turret positions a full pellet in register with the needle. The compressed spring projects the plunger through the turret and into the needle to implant the pellet. Retracting the plunger resets the spring-loaded trigger and further rotation of the feeding turret brings up another pellet. Only a full pellet in the feeding disc can release the trigger. A pellet reservoir feeds the pellets onto the rotatable feeding turret and means including a spillway and slot means facilitate the depositing of the pellets in the ports of the turret. Any pellet fragments deposited in the ports by-pass the trigger and are rejected from the turret and reservoir without actuating the implanter.

For a more complete understanding of the invention it will be described in some detail by reference to the accompanying drawings which illustrate a preferred embodiment of the pellet gun constructed and operated in accordance with the invention.

Referring to Figures 2, 3, 4, and 5, the pellets are retained within transparent reservoir 10 which may comprise a flanged vessel which is fixed to body 11 by pins 11a which pierce flange 10a. Needle 12 extends longitudinally of the reservoir 10 and of the body 11 adjacent the periphery of each. Plunger or ejector rod 13 passes within the needle 12 and the guide tube 14, having cap 15. One end 13a of the plunger 13 passes through cap 15 and terminates in rod cap 16 through which ring 17 is secured. Collar 18, provided with rubber bumper 18a, restricts the travel of the plunger 13 when pivoted and spring-loaded trigger 20 is tripped by a pellet 29 in a port 25 in rotatable turret or feeding disc 23.

End plate 22 is fixed to the body 11 by a shaft means 21 which also supports the spring-loaded trigger 20 shown in detail in Figures 8 and 9. The end plate 22 includes a boss 23a on which the turret 23 is rotated to bring successive ports 25 into alignment with the plunger 13.

The turret 23 is provided with a plurality of ports 25 in an annular array, with a slot 27 in the face of the turret 23 running through all the ports 25. The trigger 20, journaled about the shaft 21 and disposed within the cavity 20a in the body 11, is urged toward the shaft or plunger 13 by a coil spring 28 having one end fixed to the body 11 and the other end fixed to the trigger 20. The spring 28 cocks the trigger 20 in a position to act as a stop or support means for the impelling end of the rod 13 in its retracted position.

When a full pellet 29 is in the port 25, it extends into the slot 27 so that as the turret 23 is rotated the pellet 29 moves the trigger 20 against the action of the spring 28 to release the plunger 13. The plunger is thereupon moved through slot 31, the port 25 aligned with the hollow needle 12, and finally into the needle, driving the pellet 29 ahead of it and under the skin of the fowl. If a pellet fragment should become lodged within a port 25, it is too short to trip trigger lip 26 and is carried beyond the plunger 13 and trigger 20 without releasing them and falls from the body 11 of the gun through rejector port 22a in the end plate 22.

The slot 31 just referred to is in the body 11 (Figs. 11 and 12) and for a substantial length is in alignment with the peripheral array of ports 25. A ramp or spillway 30 in the body 11 slopes toward the delivery slot 31 at an angle of about 60° and greatly facilitates the loading of the random bulk pellets 29 from the reservoir 10 into the ports 25 of the turret 23.

A handle 35 is fixed to the body 11 by adjustable joint 36, permitting angular adjustment to suit the particular operator. A cord or tape (not shown) can be tied to the ring 17 with the other end fixed to the operator. It may for example be looped about the neck of the operator, tied to his belt, etc. so that merely extending the arm while holding the gun in the hand will retract the plunger 13 and cock the gun for the next implanting which is completed by rotating the turret 23 to the next port containing a full pellet. A counter can be actuated by this same motion of extending the arm to retract the plunger.

The periphery of the turret 23 is provided with a knurled edge to make it easier to rotate and if desired a means can be provided to move the turret stepwise. However, if a given port 25 is empty or contains only a fragment of a pellet, the turret will continue to rotate until the nub 26 is contacted by a full pellet 29 extending into the slot 27. Likewise, if the plunger 13 has not been retracted after a given implanting, the turret 23 cannot be rotated.

Reverting to the reservoir 10, the illustrated embodiment comprises a non-reusable transparent plastic cup having a frangible flange 10a. A plurality of pre-cut eyelets expand over the heads of the pins 11a. When the frangible reservoir 10 is pulled from the pins 11a, the eyelets tear so that they cannot again be secured about the pins and the reservoir cannot be refilled and reused. Other forms of reservoir may be devised but each should accommodate the plunger guide tube 14 and should discharge onto the spillway 30 and into the slot 31 which is aligned with the ports 25.

Although I have described my invention with reference to a particular embodiment thereof, it should be understood that this is by way of illustration only and that the scope of the invention is not necessarily limited thereby. However, from the above description, it will be apparent that I have attained the objects of my invention and have provided a disclosure which will enable those skilled in the art to fabricate and use the pellet gun of my design. Further, it is contemplated that in view of my disclosure modifications can be made in the apparatus described without departing from the spirit and scope of the invention.

What I claim is:

1. A pellet gun for hormonizing animals comprising a body, a hollow needle, a stem working in the body and needle, a spring adapted to be compressed when the stem is drawn back, a spring-loaded catch in said body for engaging the lower end of the stem when retracted, and rotatable means for delivering the pellets into line with the stem and needle, said pellets releasing said catch.

2. In a pellet injector, the combination of a hollow needle, spring-loaded means for ejecting the pellet therethrough, a reservoir for said pellets, a feeder for said pellets comprising a rotatable element having ports for the individual pellets and so mounted as, when rotated, to bring said ports in line with said needle, and ejector stop means releasable by a pellet carried in one of said ports.

3. In a pellet injector for hormonizing poultry, the combination of a reservoir body, a hollow needle communicating with said body, a handle for manipulating said injector, spring-loaded rod means for ejecting the pellet through said needle, and a feeder for said pellets comprising a rotatable disc having peripheral ports for the pellets, a circular delivery channel in the bottom of said body in alignment with said peripheral ports, and a releasable stop means for said rod means, said stop means being shiftable by a pellet in one of said ports whereby rotating said disc releases said retracted rod means and brings a port and pellet in alignment with said needle for ejection of the pellet therethrough by said rod means.

4. A pellet gun for use in hormonizing poultry which comprises in combination a body means, a separable pellet reservoir, a rotatable delivery turret mounted on one face of said body, an arcuate pellet delivery slot in a planar surface of said body in alignment with a plurality of ports adjacent the periphery of said turret, a hollow needle communicating with said body in alignment with one end of said delivery slot, a spring-loaded ejector rod working through said body, slot, and needle, a rod stop means interposed said needle and said body, trigger means on said stop means actuated only by a complete pellet in one of said ports, whereby rotation of said turret with a pellet in one of said ports brings the pellet in register with said needle and releases the ejector rod.

5. The pellet gun of claim 4 which includes a port means below said turret in its path of rotation and beyond said delivery slot through which pellet fragments are discharged by gravity without actuating said trigger means.

References Cited in the file of this patent

UNITED STATES PATENTS 1,109,072    Kozmousky _____ Sept. 1, 1914